United States Patent [19]

Iliff

[11] 3,970,967
[45] July 20, 1976

[54] CONTROLLABLE ULTRAFAST LIGHT SHUTTER

[75] Inventor: Robert L. Iliff, Canton, Mass.

[73] Assignee: The United States of America as represented by the Secretary of the Air Force, Washington, D.C.

[22] Filed: Oct. 22, 1974

[21] Appl. No.: 516,935

[52] U.S. Cl. ........................ 332/7.51; 331/94.5 M; 356/119; 350/150
[51] Int. Cl.² ............................................. H01S 3/10
[58] Field of Search............... 331/94.5 Q; 332/7.51; 250/199; 350/150; 356/117, 119

[56] References Cited
UNITED STATES PATENTS

| | | | |
|---|---|---|---|
| 3,597,695 | 8/1971 | Swain et al. | 331/94.5 Q |
| 3,678,411 | 7/1972 | Pearson | 331/94.5 |
| 3,815,046 | 6/1974 | Johnson et al. | 331/94.5 Q |
| 3,820,038 | 6/1974 | Tomlinson | 331/94.5 Q |

OTHER PUBLICATIONS

Alcork et al., "A Simple Laser Triggered Spark Gap," 7/70, pp. 1028–1029, Rev. Sci. Inst., vol. 41, No. 7.
Yoshida et al., "Investigation of Laser Pulse Forming by USG and Pochels Cells," 12/72, pp. 117–122, Trans. Instr. Electr. Eng. jap, vol. 92, No. 6.
McDarrell et al., "Use of a Power Triggered Spark Gap to Narrow–a, Q. Switch, pp. 163–164, 1/71, Rev. Sc. Inst., vol. 42, No. 1.
Coleman et al., "Direct Observation of Picosecond Structure," 5/11/72, pp. 603, IRRE Int. Quant. Ebc. Conf., Montreal, Canada.

*Primary Examiner*—Nelson Moskowitz
*Attorney, Agent, or Firm*—Joseph E. Rusz; George Fine

[57] ABSTRACT

A controllable ultrafast light shutter utilizes two sets of Pockels cell-polarizer combinations, one set is used to open the light switch, the other to close the switch allowing the selection of laser pulse duration in the picosecond region. The opening and closing of light switches thus operates as a light shutter.

1 Claim, 1 Drawing Figure

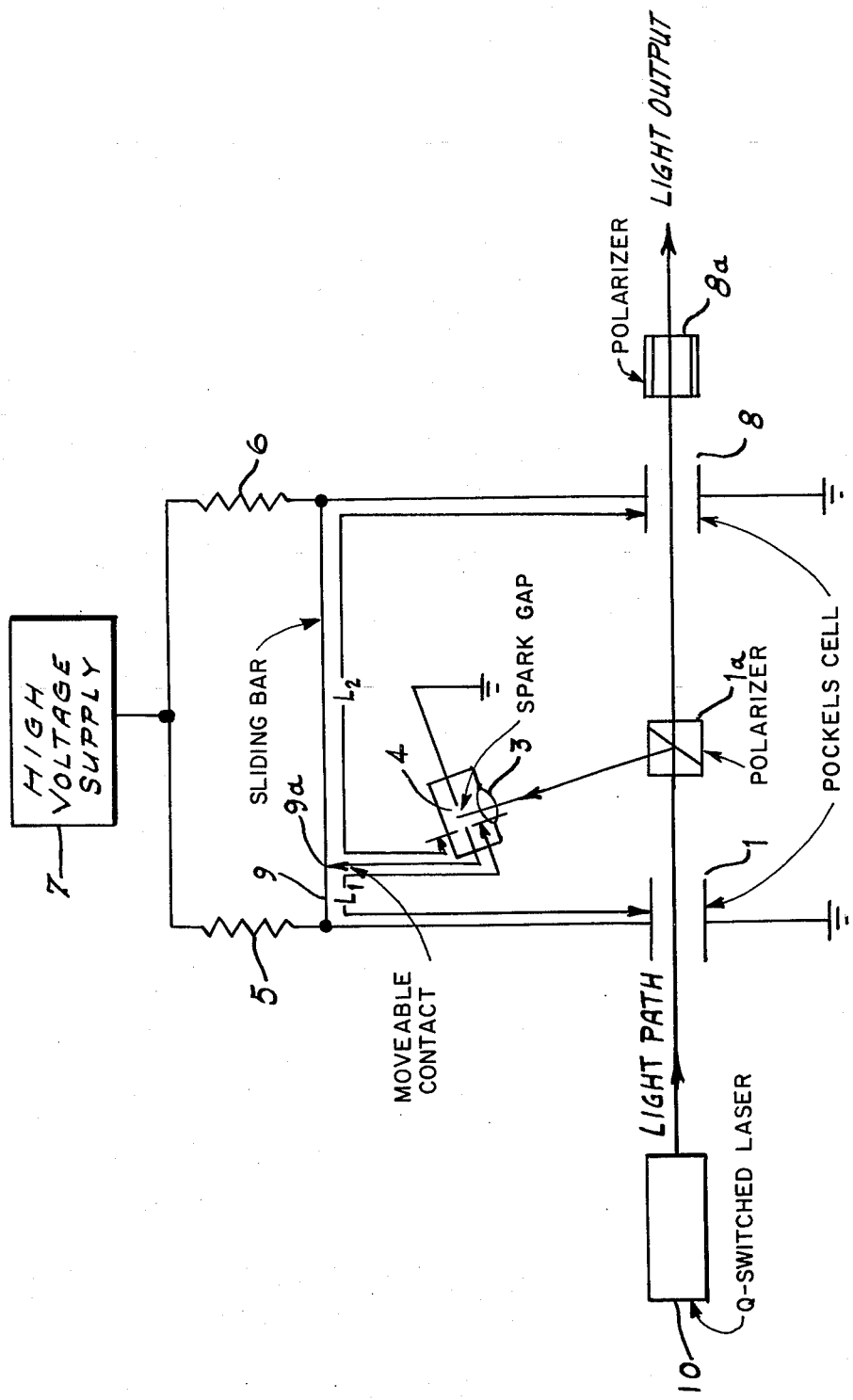

3,970,967

CONTROLLABLE ULTRAFAST LIGHT SHUTTER

BACKGROUND OF THE INVENTION

In the prior art there have been limitations in obtaining ultra-short laser pulses of selectable pulse duration. As one of the results thereof, it is difficult to obtain extreme accuracy in laser ranging. Another adverse result is the failure to accomplish significant damage studies since the laser pulse utilized therefor is not in the ultra-short category. The present invention, in sharp contrast to the prior art, provides ultra-short laser pulses of selectable pulse duration in the picosecond region. It further provides a light shutter to allow gating ultra-short light pulses.

SUMMARY OF THE INVENTION

A controllable ultrafast light shutter is provided. The light shutter uses in part a conventional laser triggered spark gap but adds a "tail biter" to terminate the pulse, thus closing the shutter. There are two Pockels cells and two polarizers. When either switch is in the "off" condition the entire switch is off. In the initial static condition the first Pockels cell (PC) polarizer combination causes the switch to be in the "off" condition while the second PC polarizer is "on" due to the fact that the polarizers are crossed.

One of the features of the invention includes the use of a spark gap to ground the high voltage electrode of a Pockels cell. Another feature is the use of a second Pockels cell polarizer combination to terminate the light passing through the light switch ("tail biter"). Still another feature permits the selection of light pulse duration in the picosecond region.

DESCRIPTION OF THE DRAWING

The single FIGURE partly in schematic and partly in block form shows a preferred embodiment of the invention providing a simple apparatus and method for obtaining ultra-short laser pulses of selectable pulse duration.

DETAILED DESCRIPTION OF THE PREFERRED EMBODIMENT

Now referring in detail to the single FIGURE of this invention, there is shown conventional source 10 of a polarized Q switched laser pulse which passes through conventional Pockels cell 1. Pockels cell 1 and polarizer 1a are a first combination. The polarized light is rotated 90° as it passes through and is deflected by conventional polarizer 1a (Glan prism or equivalent) to lens 3 which focuses the light in spark gap 4. When spark gap 4 breaks down, the high voltage sides of Pockels cells 1 and 8 are grounded causing the remainder of the laser pulse to pass through.

Pockels cell 8 and polarizer 8a are a second combination. The second Pockels cell-polarizer combination goes to the off condition, closing the entire light switch. The length of time the entire switch is open is the only time there is an output from polarizer 8a. The on time is dependent on the time differences in grounding the high voltage sides of two Pockels cells 1 and 8 which is dependent on the length difference of two grounding cables $L_1$ and $L_2$.

The switch is on for the length of time determined by the equation: Time — on $= (L_2 - L_1)/V$ where $L_1$ equals cable length from spark gap 4 to Pockels cell 1, $L_2$ equals cable length from spark gap to Pockels cell 8, and $V$ equals velocity in the cable. Further, the delay from breakdown to Pockels cell switching is dependent on the length of $L_1$ and is determined by: Delay time = $L_1/V$.

When operated in the mode whereby the high voltage side of the Pockels cell is grounded for switching, there is no concern for impedance matching, therefore, for very short on times sliding bar 9 and moveable contact 9a may be used for fine tuning cable length differences.

Sliding bar 9 is for adjusting length differences between $L_1$ and $L_2$. Resistors 5 and 6 are for current limiting and are chosen to be compatible with high voltage supply 7.

The embodiment of this invention further includes use of the tail biting in the laser triggered spark gap (LTSG) if the high voltage pulse is directed to a second Pockels cell to terminate the shutter. Further, the embodiment includes use of the light shutter to gate any light (long pulse or CW) irrespective of how the Pockels cells are voltage switched if the on time is dependent on cable length difference.

Thus the present invention provides a light shutter using a conventional laser trigger spark gap (LTSG) but adding a tail biter to terminate the pulse, thus closing the switch. There is utilized two Pockels cell-polarizer combinations, one set is used to open the light switch, the other to close the switch. The timing of opening and closing of the switch (i.e., the duration the entire light switch allows light to exit) is dependent on wire length differences. The wire length differences are easily working lengths, as a length difference of 1 cm corresponds to a "switch open" duration of 50 picoseconds ($50 \times 10^{-12}$ seconds) in typically used cables.

What is claimed is:

1. A controllable ultrafast light shutter to provide an ultrashort laser pulse of selectable duration in the picosecond region consisting essentially of a Q switched laser providing a polarized light pulse of a first preselected duration to be reduced to a second preselected duration in said picosecond region, a first Pockels cell having a high voltage side, a first polarizer associated with said first Pockels cell to provide a first combination, a second Pockels cell having a high voltage side, a second polarizer associated with said second Pockels cell to provide a second combination, said Q switched laser, said first Pockels cells, said first polarizer, said second Pockels cells, said second polarizer being arranged on a common longitudinal axis and in the recited sequence with said polarized light pulse being the input light pulse to said first Pockels cell and said second polarizer providing the output pulse of said second preselected duration, a spark gap having first and second electrodes, said second electrode being grounded, a lens associated with said spark gap, a sliding bar having first and second ends, a high voltage supply, first and second current limiting resistors, said first current limiting resistor connected between said high voltage supply and said first end of said sliding bar, said second current limiting resistor connected between said high voltage supply and said second end of said sliding bar, a sliding contact for said sliding bar connected to said first electrode of said spark gap, a first cable consisting of the electrical connection from said high voltage side of said first Pockels cell to said first end of said sliding bar to said first electrode of said spark gap, a second cable consisting of the electrical connection from the high voltage side of said second Pockels cell to said second end of said sliding bar to said first electrode of said spark gap, said second cable being of greater length than said first cable, said input light pulse to said first Pockels cell passing through said first combination with said first polarizer rotating the input light pulse 90° during the passage therethrough and also simultaneously deflecting the light pulse to said lens, said lens focusing the deflected light pulse between said electrodes of said spark gap and upon breakdown thereof grounding said high voltage sides of said first and second Pockels cells causing the remainder of the light pulse to pass through said first and second combinations unaffected, said first combination being now in the on condition allowing the remainder of the pulse to pass through while said second combination goes to the off condition closing the light shutter, said light shutter being open for the length of time determined by the length of said second cable subtracted from the length of said first cable with the difference in length being divided by the velocity in the cables.

* * * * *